Sept. 21, 1971   J. A. MacKENZIE   3,606,814
RELEASABLE REUSABLE EXPANDING FASTENER
Filed Feb. 17, 1969

INVENTOR
JAMES A. MacKENZIE
BY
ATTORNEYS

United States Patent Office

3,606,814
Patented Sept. 21, 1971

3,606,814
RELEASABLE REUSABLE EXPANDING FASTENER
James A. MacKenzie, Apt. 601, 100 Bronson Ave., Ottawa, Ontario, Canada
Filed Feb. 17, 1969, Ser. No. 799,689
Claims priority, application Canada, Feb. 23, 1968, 13,256
Int. Cl. F16b *13/04*
U.S. Cl. 85—84        2 Claims

ABSTRACT OF THE DISCLOSURE

This invention is concerned with a releasable, reusable, expanding fastener particularly intended for adjustably securing together slotted metal construction elements. The fastener is formed from resilient material and consists of two parts, namely a sleeve and a sleeve expanding member. The sleeve comprises a plurality of finger members extending from a flange member shouldered at right angles to the major axis of the sleeve. The expanding member comprises a cylindrical shaft provided with a flange at one end, a tapered head at the opposite end, a locking recess just inwardly of the head and a gradually tapering camming surface extending rearwardly of the locking recess. The fingers have locking shoulders which are generally complementary in shape to the locking recess on the shaft of the expanding member. These shoulders are located on the inner surfaces of the fingers, substantially midway there-along. The head on the shaft and the locking shoulders co-operate with one another to retain the expanding member within the sleeve when the latter is in an unexpanded condition, and, when the sleeve and expanding member have been passed through a pair of aligned apertures with the sleeve in the unexpanded condition, the expanding member may then be driven forwardly within the sleeve towards the ends of the fingers whereupon the locking shoulders will co-operate with the camming surface on the sleeve to expand the fingers and securely fasten the sleeve and expanding members within the said apertures.

BACKGROUND OF THE INVENTION

The present invention relates to a releasable reusable expanding fastener and particularly to a fastener of this nature for detachably securing together slotted metal constructional elements.

Slotted metal constructional elements are increasingly widely being used, particularly in the fields of industrial shelving and racking. When the shelving, racking or other construction has served its purpose, it is dismantled and the slotted elements reused at a later date. Conventionally, slotted metal constructional elements have been joined to one another by means of nuts and bolts. The tightening of the nuts on the bolts during erection, and the removal of the nuts from the bolts involved in dismantling a structure, have been time consuming operations. The nuts and bolts used in this manner can, very advantageously, be replaced by the releasable, reusable expanding fasteners of the present invention.

SUMMARY OF THE INVENTION

The fasteners of the present invention, when inserted through aligned orifices in superposed slotted metal construction members, can be expanded so as to lock the members to one another. When it is desired to separate the members, the fastener of the present invention can be quickly altered from an expanded into a relaxed condition, whereupon it can be simply withdrawn from the aligned apertures, preparatory to separation of the superposed structural members.

The present invention may be generally defined as a releasable, reusable expanding fastener for detachably securing together superposed members having aligned apertures, said fastener being formed of a resilient material and comprising a sleeve and a sleeve expanding member permanently slidably mounted within said sleeve. The sleeve includes a flange shouldered at right angles to the major axis of said sleeve and a plurality of axially extending spring fingers, said fingers having a collective outside diameter which is slightly smaller than the minor dimensions of said apertures toward each end of the sleeve and a central portion which has a collective outside diameter greater than the minor dimension of said apertures when said fingers are in relaxed condition, said fingers being flexible inwardly to permit their insertion through said apertures. The expanding member comprises a cylindrical shaft provided with a flange at one end shouldered at right angles to the major axis of the shaft, said shaft having a tapered head at its opposite end, a locking recess just inwardly of said head and a gradually tapering camming surface inwardly of said locking recess. The fingers have locking shoulders generally complementary in shape to said locking recess located on the inner surfaces of said fingers substantially mid-way therealong. The head on the shaft and the locking shoulders co-operate with one another to retain the expanding member within the sleeve when the latter is in an unexpanded condition; and the locking shoulders co-operate with the camming surface on said sleeve to expand said fingers and securely fasten the sleeve and expanding member within said apertures, thus locking the superposed members to one another, whenever said expanding member is driven inwardly to a position in which the flange on the shaft contacts the flange on the sleeve. The shaft is of no greater length than said fingers so that its head will be protected by said fingers even when the expanding member has been driven into the last-mentioned position.

BRIEF DESCRIPTION OF THE DRAWINGS

The appended drawings illustrate a presently preferred embodiment of the fastener of this invention, wherein.

DESCRIPTION OF A PREFERRED EMBODIMENT

The fastener of the invention essentially consists of a sleeve 10 and a sleeve expanding member 11 which is slidable within the sleeve 10. The sleeve 10 and member 11 are so arranged that even when the sleeve is in the relaxed position one cannot, without great force, separate the expanded member 11 from the sleeve 10. The member 11 is normally maintained with respect to the sleeve 10 in a position in which the fastener is immediately ready for reuse. The nature of this arrangement will be described in greater detail later on in this specification, it being at the moment more convenient to give a description of the sleeve itself.

Figure 1:
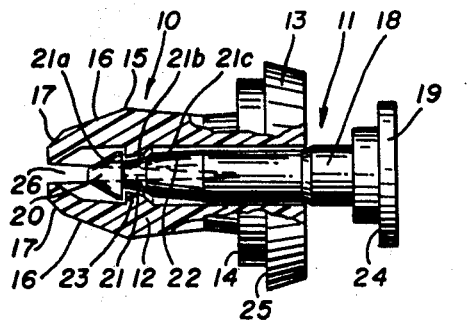
FIG. 1 is a side view partially cut away to reveal the internal construction.
Figure 2:
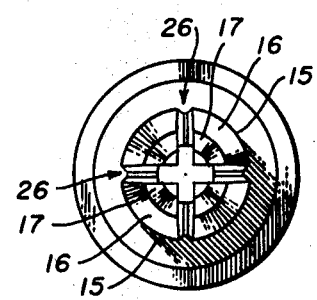
FIG. 2 is a front end view.

The sleeve 10 comprises a plurality (preferably four) of similar spring fingers 12 extending axially from a flange 13 having right angular shoulders 14. There are a number of conventional sizes for the apertures in slotted metal angles and the fingers on the fasteners of the present invention have a collective outside diameter in the portions thereof adjacent the shoulders 14 which is just less than the minor dimension of the pair of slots they are to occupy. The fingers then taper slightly outwardly to reach a maximum diameter at the intermediate point marked 15 in FIG. 1. The diameter at this point is greater than the said minor axis of the aperture. The fingers then taper towards their ends as indicated at 16 and 17 to facilitate insertion of the fastener in the apertures. The sleeve expanding member 11 comprises a cylindrical shaft 18 having a flange 19 at one end thereof and a tapered head 20 at the other end thereof. A locking recess 21 extends around the shaft 18 immediately behind the tapered head 20, and immediately aft of the recess 21, the shaft is provided with a tapered camming surface 22. Each of the fingers 12 is provided, on its inner surface and intermediate ends, with locking shoulders 23, each locking shoulder being complementary in cross-section with the locking recess 21 on the shaft.

The leading edge 21a of the recess 21 is transverse to the axis of the pin, the base 21b of the recess tapers outwardly with distance from the head 20, and the trailing edge 21c of the recess is sloped away from the head 20. As already indicated, the shoulders 23 on the inner faces of the fingers 12 are shaped complementarily to the recess 21.

The flange 19 on the expanded member 11 is stepped as indicated at 24 to facilitate its withdrawal relative to the sleeve from a sleeve expanding to a sleeve relaxing position and the flange 13 on the sleeve 10 is stepped as indicated at 25 to facilitate its withdrawal from the apertures in the structural members after relative movement of the member 11 to relax the expanded fingers of the sleeve.

Figure 3:
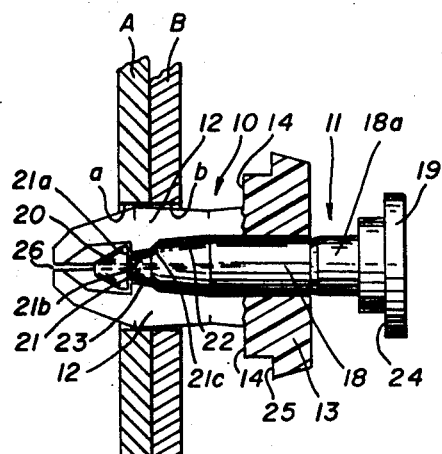
FIG. 3 is a cross-sectional view showing the fastener in the first stage of being inserted through a pair of aligned apertures in two superposed constructional members.
Figure 4:
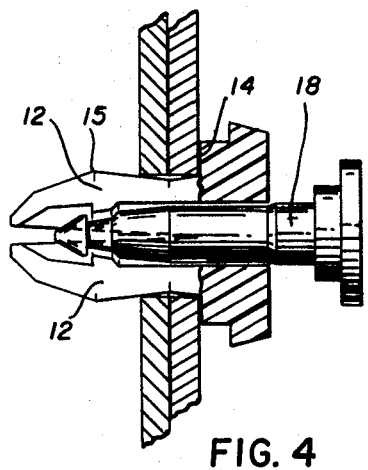
FIG. 4 is a generally similar view but showing the sleeve fully inserted in the aligned apertures with the sleeve as yet unexpanded.
Figure 5:
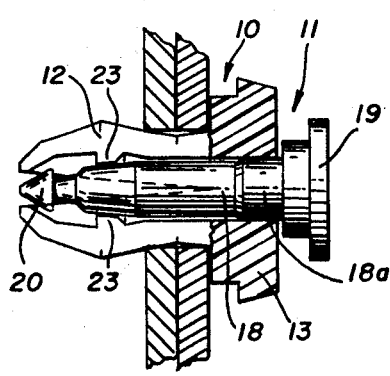
FIG. 5 is a generally similar view but showing the fastener in expanded position wherein the expanded sleeve and its associated expanded member have firmly joined the two apertured constructional elements to one another.

FIGS. 3, 4 and 5 illustrate the use of the fastener of this invention to fasten together two apertured structural members labelled A and B in the figures. Apertures a and b in the members A and B have been aligned with one another. With the sleeve 10 and expanding member 11 in the relative positions shown in FIG. 3, one starts to join the members together by passing the tapered ends of the fingers 12 through the aligned apertures a and b. Since the portions of the fingers having the maximum collective diameter are of a diameter greater than that of the apertures they are being inserted through, the fingers will move slightly toward one another as they pass through the apertures. This is seen to have occurred in FIG. 3 where it will be noted the V 26 which separates the two fingers from one another is smaller than the one shown in FIG. 1 where there is no pressure on the fingers.

The sleeve 10 is passed through apertures a and b until the shoulders 14 on the flange 13 bear against the outer surface of member B, i.e. into the position shown in FIG. 4. When the sleeve is in this position, the portion of the sleeve which is actually within the apertures a and b is of less diameter than the minor axis of these apertures so that there is no inward pressure upon the fingers 12. When in this position, the sleeve 10 will not accidentally fall out of the apertures since the collective diameter of the fingers in the region 15 which is now outwardly of the outer surface of member A is greater than the minor axis of the apertures, all of which may be noted from FIG. 4.

The fingers of the fastener are now forcibly outwardly expanded to the position shown in FIG. 5 by applying axial pressure to the flange 19 which is driven inwardly until its base contacts the outer face of the flange 13. As this inward driving of the sleeve expanding member 11 carries shaft 18 inwardly, the locking shoulders 23 on the inner faces of the fingers 12 are forced out of the recess 21 and these shoulders gradually force the ends of the fingers outwardly as the camming surface 22 penetrates further past the shoulders 23.

In the final expanded position shown in FIG. 5, the portions of the fingers which extend outwardly from the aperture a are expanded to a point where the outer surfaces of the fingers bear tightly against the outer edges of the aperture a. The portions of the fingers 12 which extend from aperture a are held in an expanded position wherein they have a collective diameter greater than the minor axis of the aperture a, thus precluding withdrawal of the sleeve from the apertures.

It may be noted, particularly from FIG. 5, that the shaft 18 of the sleeve expanding member is slightly shorter than the overall length of the sleeve 10 so that even in the expanded position the head 20 of the shaft does not extend beyond the end of the fingers. It is therefore protected by the fingers, and accidental impact against the inner end of the fastener will not result in inadvertent release of the sleeve from its expanded position.

As a precaution against inadvertent displacement of the expander member 11 into the sleeve expanding position illustrated in FIG. 5, I preferably provide the outer end of the shaft 18 (see FIGS. 1, 3, 4 and 5) with a portion 18a of slightly enlarged diameter. This portion 18a should be a press fit with the outer end of the bore through the flange 13 in the sleeve 10. This enlarged portion 18a is not essential, however, since inadvertent insertion to the sleeve expanding position is normally also prevented by the fact that when the sleeve is in the relaxed position the shoulders 23 on the inner surface of the fingers will be resting in the recess 21 in the shaft 18. It will also be appreciated that the shoulders 23 will bear against the head 20 and prevent separation of the expanding member 11 from the sleeve 10.

Figure 6:
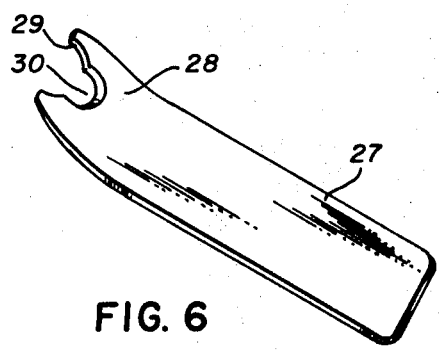
FIG. 6 is a persepective view of a lever found useful for quick release of the fastening member of the invention.

To release the fastener, one simply pries outwardly upon the step 24 to move member 11 outwardly relative to sleeve 10, i.e. from the FIG. 5 position to the FIG. 4 position. One can then remove the two items as a unit by prying outwardly upon the step 25 of the sleeve flange 13. For these releasing steps, I have found it convenient to employ a small lever 27 of the type shown in FIG. 6 having an upwardly turned end 28, said upwardly turned end 28 being cut out semi-circularly as indicated at 29 so as to be able to embrace flange 13 of sleeve 10 below the step 25 to pry member 11 from the FIG. 5 to the FIG. 4 position, and being further semi-circularly cut out at 30 so as to be able to embrace the flange 19 below the step 24 to pry member 10 from the FIG. 4 position to the FIG. 3 position.

While there are a large number of resilient materials capable of forming the fastening member of this invention, I wish to report that I have had good success with a nylon material sold under the trade mark "Zytel 101" by E. I. du Pont de Nemours and Co. Other materials which could be used are steel and a number of hard resilient synthetic resins.

What I claim as my invention is:

1. A releasable, reusable expanding fastener for detachably securing together superposed members having aligned apertures, said fastener being formed of a resilient material and comprising a sleeve and a sleeve expanding member permanently slidably mounted within said sleeve;
   (a) said sleeve including a flange shouldered at right angles to the major axis of said sleeve and a plurality of longitudinally extending resilient fingers,
   (b) said fingers having, at a point adjacent their roots, a reduced outside diameter which is slightly smaller than the minor dimension of said aligned apertures, and a central portion which, when said fingers are in a relaxed condition, has a collective outside diameter greater than the minor dimension of said aligned apertures, said fingers gradually tapering outwardly between said point of reduced diameter and said central portion, (c) said fingers being inwardly directed at their free end and being flexible inwardly to permit their insertion through said aligned apertures, (d) said expanding member comprising a cylindrical shaft provided at one end with a flange shouldered at right angles to the major axis of the shaft, (e) said shaft having a tapered head at its opposite end, (f) said shaft having a locking recess just inwardly of said head and a gradually tapering camming surface extending inwardly of said locking recess, (g) said fingers having locking shoulders generally complementary in shape to said locking recess, said shoulders being located on the inner surface of said fingers substantially midway therealong and at the same distance outwardly from the roots of said fingers as said central portion, (h) the head on the shaft and the locking shoulders on the sleeve cooperating with one another to retain the expanding member within the sleeve when the latter is in an unexpanded condition, (i) said locking shoulders cooperating with the camming surface on said sleeve to expand said fingers and securely fasten the sleeve and expanding member within said apertures, thus locking the superposed members to one another, whenever said expanding member has been driven inwardly to a position in which the flange on the shaft contacts the flange on the sleeve, (j) said shaft being of no greater length than said fingers so that its head will be protected by said fingers even when the expanding member has been driven into the last-mentioned position, (k) the flange on the expanding member being circumferentially stepped through substantially 360 degrees to facilitate its withdrawal relative to the sleeve from a sleeve expanding to a sleeve relaxing position, and (l) the flange on the sleeve being circumferentially stepped through substantially 360 degrees to facilitate its withdrawal from the aligned apertures.

2. A fastener as defined in claim 1, in which a portion of the shaft adjacent its flange is of slightly greater diameter than the remainder and is a press fit within the outer end of the sleeve.

References Cited

UNITED STATES PATENTS

| 1,944,513 | 1/1934 | Johnson | 85—84 |
| 3,099,931 | 8/1963 | Ferdinand | 24—211 |
| 3,116,528 | 1/1964 | Poe | 85—84 |
| 3,438,302 | 4/1969 | Sandor | 85—84 |

FOREIGN PATENTS

| 925,034 | 5/1963 | Great Britain | 85—84 |

EDWARD C. ALLEN, Primary Examiner